United States Patent
Michael et al.

[11] 3,849,154
[45] Nov. 19, 1974

[54] PROCESS FOR THE CONTINUOUS PRODUCTION OF FIBRE-REINFORCED POLYAMIDE MOULDING COMPOSITIONS

[75] Inventors: Dietrich Michael, Krefeld; Heinrich Gilch, Bonn-Ippendorf; Wilhelm Hechelhammer, Krefeld, all of Germany

[73] Assignee: Farbenfabrik Bayer, Aktiengesellschaft, Leverkusen, Germany

[22] Filed: Mar. 15, 1972

[21] Appl. No.: 234,907

[52] U.S. Cl............. 117/4, 117/115, 117/126 GB, 117/128.4, 117/161 P, 117/132 C
[51] Int. Cl..................... B32b 17/04, C03c 25/02
[58] Field of Search...... 117/4, 126 GB, 128.4, 115, 117/161 P

[56] References Cited
UNITED STATES PATENTS

| | | | |
|---|---|---|---|
| 3,143,405 | 8/1964 | Wong | 117/126 GB |
| 3,149,094 | 9/1964 | Fields | 117/128.4 X |
| 3,190,856 | 6/1965 | Lavin | 117/128.4 X |
| 3,206,418 | 9/1965 | Giberson | 117/126 GB |
| 3,323,945 | 6/1967 | Hechelhammer et al. | 117/161 P |
| 3,382,195 | 5/1968 | Gilch | 260/37 N |
| 3,460,973 | 8/1969 | Hantzer et al. | 117/126 GB |
| 3,574,146 | 4/1971 | Schnell et al. | 260/2.5 |
| 3,591,533 | 7/1971 | Schnell et al. | 260/2.5 |

OTHER PUBLICATIONS

Chemical Abstract, Vol. 66: 76573 X, 1967.
Chemical Abstracts, Vol. 53; 15732 C, 1959.

*Primary Examiner*—William D. Martin
*Assistant Examiner*—William H. Schmidt
*Attorney, Agent, or Firm*—Plumley & Tyner

[57] ABSTRACT

Process for the continuous production of fibre-reinforced polyamide moulding compositions, wherein a fibre structure is impregnated with a polymerisation mixture consisting of a lactam, alkali or alkaline earth metal salt of an acid the pK of which is between 3 and the pK of the lactam, and an isocyanate activator, thereafter polymerisation is carried out and then the impregnated fibre structure is chopped to a granulate.

12 Claims, 1 Drawing Figure

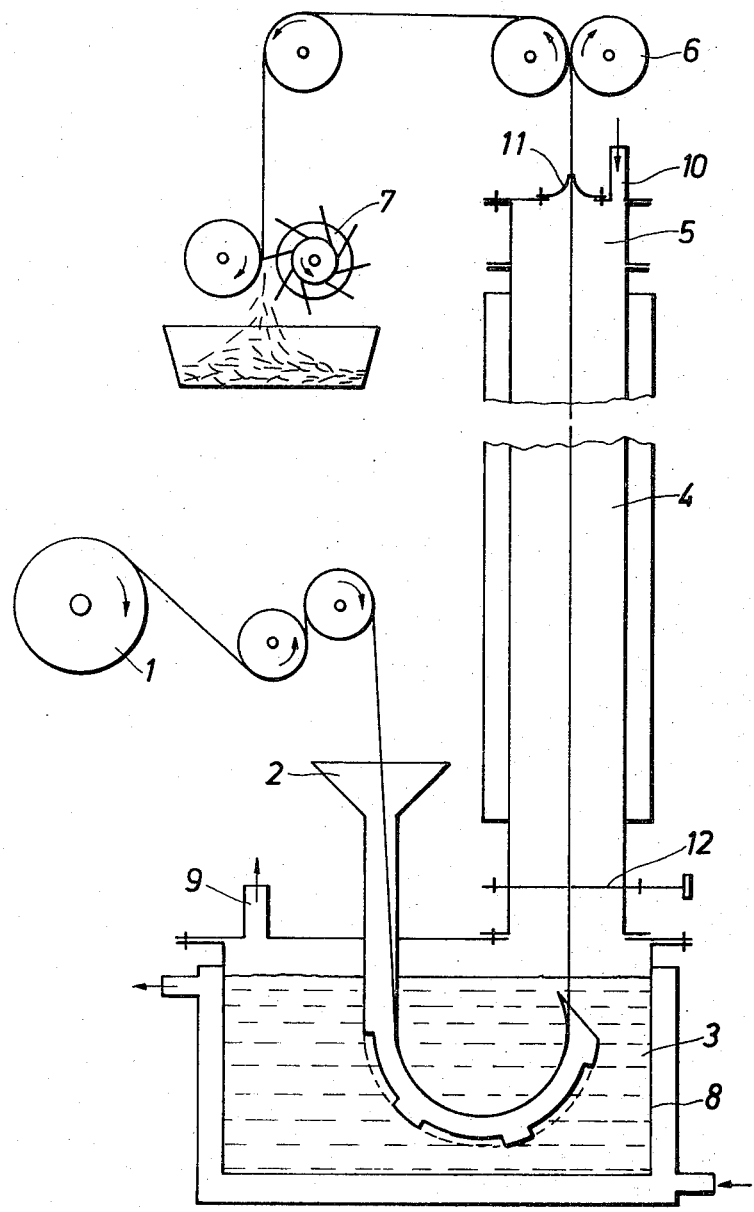

PROCESS FOR THE CONTINUOUS PRODUCTION OF FIBRE-REINFORCED POLYAMIDE MOULDING COMPOSITIONS

This is a continuation, of application, Ser. No. 889,360 filed Dec. 31, 1969, now abandoned.

This invention relates to a process for the continuous production of fibre-reinforced polyamide moulding compositions of any desired fibre content, especially of high fibre content, and of any desired viscosity.

Substantially all the mechanical and electrical properties of polyamides are known to be improved and their sensitivity to water is known to be reduced through the incorporation in them of fibres, especially glass fibres. The strengthening effect of the glass fibres is substantially proportional to the quantity in which they are present in the polyamide, so that it is frequently desired to increase the fibre content to 70, 80 or even 90 percent by weight. Unfortunately, it is either totally impossible or extremely difficult to meet this requirement with conventional processes.

It is known that fibres can be worked into polyamides in screw extruders. When the fibres used are glass fibres, it is common practice to employ either so-called short fibres with an average length of less than 1 mm, or so-called long fibres generally between 3 and 10 mm long, or endless fibre strands. Although screws differing in type and design, depending upon the starting materials, are used in order to produce end products having favourable properties, the difficulties involved in producing the moulding compositions are greater when larger glass fibre contents are required. Quantities of from 60 to 70 percent by weight can only be incorporated at considerable expense, while quantities larger than these are substantially impossible to work in. In addition to this, the average length of the fibres must be increasingly shorter as the glass fibre content of the moulding compositions themselves is increased, and this applies even more with compositions which are to be remelted and injection-moulded. In such compositions, the length of the fibres is reduced even further.

Since the length of the fibres determines their strengthening effect, it is not possible by means of this process to provide the most favourable properties.

Attempts to eliminate this disadvantage have been made by developing processes starting from endless fibres which, instead of being delivered to an extruder, are either immersed in and drawn through a polymer melt or alternatively are coated with a polymer melt. Glass fibre contents of 80 percent by weight and higher are readily obtained in the coating process. Unfortunately, considerable outlay is involved in obtaining a serviceable granulate. Most of the glass fibres are accommodated unwetted in a sheath of the polymer, so that they can be pulled out during the cutting process because it is not always easy to cut through glass fibres. Although it is possible to prevent this phenomenon by increasing the cut lengths to 10 mm and longer, difficulties are inevitably encountered in measured feeding during further processing.

Although it is possible by drawing the fibre strands through a polyamide melt to obtain a product which is easier to size-reduce, the viscosity of the melt causes considerable difficulties in a process of this kind. Although it is possible, by applying special but expensive measures, to obtain an undiscoloured strand, the strand thus obtained is far from being uniformly impregnated.

One disadvantage common to all the conventional processes referred to above is that melts of the completed polymer are required for incorporating the fibres. Accordingly, it has been proposed to use low viscosity monomers, namely lactams, instead of a polyamide melt as starting material. By drawing the fibres through monomers of this kind, it is readily possible to obtain a completely impregnated strand. In this process, the monomer is intended to be subsequently converted into polyamide by conventional ionic polymerisation. Polymerisation is carried out in the presence of alkaline catalysts and polymerisation accelerators, for example isocyanates or isocyanate donors, carbodiimides, cyanamides or N-acylated lactams. Unfortunately, the following obstacles affect both the polymerisation process and the end product. In the first place, all conventional systems with which activated ionic polymerisation is possible are extremely sensitive to water. Even a quantity as small as 0.04 percent by weight is sufficient to prevent polymerisation. Even below this limit, the induction period, that is to say the period which elapses before polymerisation of the lactam mixture starts, is influenced to a very considerable extent by the water content. To obtain reproducible results, any traces of water have to be removed from the lactam before the reaction, which is best achieved by distillation.

Moreover, lactam melts containing strong bases as catalysts, for instance alkali metal and alkaline earth metal lactams, are extremely sensitive to oxygen even at temperatures as low as the melting temperature, and the reaction product is discoloured.

Furthermore, even in the complete absence of water and oxygen, the melts very quickly lose their activity and can either no longer be polymerised at all or can only be polymerised into an unsatisfactory product.

It is extremely expensive and substantially impracticable in commercial practice to produce thin layers and films of polyamide by the activated ionic polymerisation process, on account of the relatively large surface areas involved. The same applies when the activated ionic polymerisation process is carried out on the fibre strand. The surface of any given amount of monomer increases with increasing fibre content. Thus, even traces of moisture in the surrounding medium are sufficient to terminate the polymerisation reaction. In addition, there are always traces of water on the surface of glass fibres which are almost impossible to remove without damaging the adhesion promoters. Accordingly, it is necessary to operate in a thin tube or pipe, which is of considerable detriment to the simplicity and variability of the process, or alternatively to carry out polymerisation in an inert gas atmosphere which must be kept completely free from any traces of water. The same applies as regards other fibre-based products such as webs, woven fabrics and wadding.

It is also known that polyamide foams can be obtained in the presence of an excess of isocyanate serving both as activator and as blowing agent, and in the presence of alkali metal salts of carboxylic acids (U.S. Pat. No. 3,382,195 and British Pat. specification No. 1,112,515) or other relatively weak bases as catalysts. Other catalysts include alkali metal and alkaline earth metal borohydrides which are also distinguished by their outstanding activity (Belgian Pat. No. 701,945).

Surprisingly, it has now been found that the aforementioned mixtures for the production of foams are also eminently suitable for the production of polyamide coatings on fibres, webs, woven fabrics and mats without any danger of bubble formation during coating.

It is an object of this invention to provide a process for the continuous production of fibre-reinforced polyamide moulding compositions that avoids all disadvantages mentioned above.

This object is accomplished by a process for the continuous production of homogeneous fibre-reinforced polyamide moulding compositions which comprises drawing a fibre structure through a melt of a polymerisation mixture, which is stable for at least 30 minutes at the temperature of the melt and impregnating said structure with the polymerisation mixture, thereafter guiding the impregnated structure thus obtained through a reaction zone which has a temperature in the range from the temperature of the polymerisation mixture to 350°C, cooling the polymerised structure thus obtained and thereafter chopping it into a granulate, said polymerisation mixture comprising a lactam, from 0.05 to 10 percent by weight, based on the lactam of a catalyst selected from the group consisting of an alkali metal and an alkaline earth metal salt of an acid whose pK is between 3 and the pK of the lactam used, and from 0.05 to 20 percent by weight, based on the lactam used, of an activator selected from the group consisting of an organic isocyanate and a masked organic isocyanate.

Before ionic polymerisation of the lactam, some of the isocyanate reacts to form carbodiimide and isocyanuric acid derivatives, accompanied by the evolution of carbon dioxide. When diisocyanates or polyisocyanates are used, polycarbodiimides branched by isocyanuric acid units are formed. These products constitute activators which are incorporated in the polyamide during polymerisation of the lactam.

This process is not affected by any of the defects referred to above. The polymerisation mixture remains stable at the melting temperature for long periods, amounting to several weeks when sodium formate is used as catalyst. The melt is much less sensitive to water. Reproducible polymerisation is possible even where the water content is as high as 0.3 percent by weight. Stability in storage and stability at the melting temperature diminish as the basicity of the catalyst increases, while sensitivity to water and oxygen increase. The process does not involve the use of any expensive machinery and apparatus and enables a fibre-reinforced polyamide of any desired fibre content and any required relative solution viscosity to be continuously obtained, that is to say, it is possible to obtain a material that is able to meet the requirements imposed on it by injection-moulding machines and extruders.

It must be regarded as extremely surprising that, despite the use of organic isocyanate in quantities as large as those normally used in the production of polyamide foams, it is possible by the process according to the invention to obtain fibre-reinforced polyamide moulding compositions which have a completely homogeneous, non-porous structure. Due to the large surface, the gas given off passes out of the polyamide-forming mixture, either before or during polymerisation, forming a protective gas atmosphere for the still hot polyamide as it does so.

Polymerisation can be controlled in such a way as to give a bubble-free, fibre-reinforced polyamide which has the required relative solution viscosity and the required glass fibre content. One embodiment of the process according to the invention is described by way of example in the following with reference to the accompanying drawing.

Referring to the drawing, a glass fibre strand drawn off from a roving 1 is delivered through a funnel-shaped pipe section 2 into the melt 3 of a polymerisable mixture in an immersion vessel or tank 8. The strand, impregnated with the required quantity of polymerisation mixture (the quantity adhering to the strand is regulated by a stripper 12) travels through a reaction zone 4. After cooling in a cooling zone 5, the thus-obtained glass-fibre-reinforced polyamide strand is delivered by variable speed draw-off means 6 to a chopping machine 7. If it is desired to operate in the presence of an inert gas, which can be introduced at 9 or 10 and let out at 10 or 9, depending on whether co-current or counter-current gas flow is used, the reaction tube is sealed with sealing lips (for example of Teflon) at the outlet for the strand 11. Webs and woven fabrics can be similarly processed.

Mixtures consisting of lactam, from 0.05 to 10 percent by weight of a basic alkali metal or alkaline earth metal compound and from 0.05 to 20 percent by weight, but at least 1 mol percent, based on the lactam, of an organic isocyanate, have proved to be suitable starting systems for the process according to the invention.

To prepare polymerisation mixtures that are substantially unaffected by water, are stable in storage and are also stable for prolonged periods at the melting temperature, it has proved to be of particular advantage to use as catalysts alkali metal and alkaline earth metal salts of hydracids whose acid strength is below that of the lactam used but whose pK is greater than 3.

Of the basic alkali metal and alkaline earth metal compounds used as catalysts, the alkali metal and alkaline earth metal salts of carboxylic acids and polycarboxylic acids have proved to be particularly effective, the alkali metal and alkaline earth metal salts of formic acid, preferably sodium formate, having proved to be particularly favourable compounds. Sodium phenoxide, sodium cyanamide, sodium cyanide, potassium nitrite, potassium carbonate and calcium cyanide, for example, can be used as additional basic alkali metal or alkaline earth metal compounds. Of the alkali metal and alkaline earth metal borohydrides, it is preferred to use sodium borohydride or calcium borohydride.

The basic compounds are best used in the form of fine powders, although they may also be precipitated from lactam solutions.

Organic isocyanates are used as activators, suitable alkyl or aryl monoisocyanates or polyisocyanates include stearyl isocyanate, phenyl isocyanate, hexamethylene diisocyanate, phenylene diisocyanate, tolylene diisocyanate and diphenyl methane-4,4'-diisocyanate. Isocyanate donors (masked isocyanates) which yield isocyanates, for example when heated, such as hexamethylene-1,6-bis-carbamido caprolactam, are similarly effective. The isocyanate or masked isocyanate is added in a quantity of from 0.05 to 20 percent by weight and preferably in a quantity of more than 1 mol percent, based on the lactam.

Lactams containing at least four ring members such as caprolactam, caprylic lactam and lauric lactam, either individually or in admixture, are used as lactams in the process according to the invention. Caprolactam is preferably used. Commercial grade products may be used without further purification or drying.

To carry out the process, the aforementioned mixtures are initially fused in the impregnation vessel and then heated again before they reach the reaction zone. Appropriate measures should be taken to ensure that the temperature reached by the melt remains within the range in which the velocity of the polymerisation reaction is still low. The object of this is to ensure that there is no increase in the viscosity in the impregnation vessel. This would create indefinable and non-stationary conditions which would constitute serious obstacles to the continuous process.

For a mixture consisting for example, of caprolactam, 0.75 percent by weight sodium formate and 4.2 percent by weight hexamethylene diisocyanate, the "static period," which is the period within which there is no sign of any appreciable reaction and hence of any appreciable increase in viscosity at any given temperature, amounts to several hours at a temperature of from 115° to 125°C.

This temperature is, of course, governed by the type of lactam used and also by the type of catalyst and activator used and the quantities in which they are used.

It is also possible to operate at temperatures at which the static time of the system is shorter, amounting, for example, to only a few hours or even minutes. In this instance, however, appropriate measures must be taken to ensure that substantial exchange, i.e. consumption, of the material takes place within the corresponding static period in the melting or impregnation vessel. This is particularly important when the mixtures used contain alkali metal or alkaline earth metal borohydrides as catalyst because in this instance the static times are extremely short, even at low temperatures. For this reason, the process may readily be modified for reasons of safety into a so-called "two-pot process." This means that the catalyst and activator are each separately melted with some of the lactam, and the two component melts are combined, mixed and delivered to the impregnating vessel just before the fibres are impregnated. This ensures that polymerisation can be carried out under constant conditions, which is necessary for the control both of the viscosity and of the fibre content which is required according to the process.

There are two basic possibilities for guiding the fibre strand through the tubular reactor. The impregnation vessel has to be adapted to whichever of them is employed. If the fibres are passed downwards, they are impregnated in a funnel-shaped vessel whose neck has to be adapted to the required thickness of the strand. It is, however, preferred to impregnate fibres in an immersion vessel and then to guide the strand upwards through the tubular reactor.

As it moves upwards, the strand takes some of the melt with it, depending upon the viscosity of the melt. Adjustment to a predetermined fibre content is carried out before entry into the tubular reactor, by means of stripping or squeezing means which remove the excessive components. If fibre contents of greater than 40 percent by weight are required, it is best to use mixtures which, apart from lactam, catalyst and activator, do not contain any other additives with a marked effect upon viscosity. If relatively low fibre contents are required, it is advisable to introduce into the mixture substances which increase viscosity, for example extremely fine divided silica or small quantities of polymers, especially soluble polyamides. Even better results are obtained by using so-called prepolymers prepared from the polymerisation mixtures, i.e., lactam + catalyst + activator, by heating them at low reaction temperatures, for example from 150° to 180°C, until they reach the required relative solution viscosity, for example 1.8 (as measured on a 1 percent solution in m-cresol at 20°C). The reaction is then terminated by cooling. The advantage of these prepolymers over other viscosity-increasing additives is that they continue polymerising at the temperatures prevailing in the tubular reactor. Although there are no limits to the quantities in which they are used, they are preferably present in the mixture in quantities of up to 20 percent by weight because the entire system may also be prepolymerised to a certain relative solution viscosity and then delivered to the immersion tank. Unfortunately, this makes the process somewhat more expensive to operate.

The mixtures are actually polymerised in the tubular reactor in which the strand is heated at a temperature in the range from the temperature of the melt in the immersion tank to 350°C, and preferably in the range from 170°C to 300°C. The polymerisation reaction may be carried out under atmospheric conditions, although it is best carried out in the presence of inert gases, such as nitrogen and carbon dioxide, because otherwise oxidation would readily occur at high temperatures, resulting in discolouration of the surface. There is no need to take any precautions to remove moisture from the gases.

Both the temperature and the residence time in the reaction zone are important factors in controlling the ultimate viscosity of the fibre-reinforced polyamides produced according to the invention. At a given temperature, the relative solution viscosities of the polyamide increase with increasing residence time, as demonstrated in Examples 2 and 4. Although the residence times may be in the range from 0.25 to 25 minutes, they are preferably from 1 to 10 minutes.

Another method of heating the impregnated strand is immediately to plunge it into and pass it through a hot inert liquid, for example silicone oil. In this way, it is possible to obtain a more effective transfer of heat from the heating medium to the strand, reflected in shorter residence times in the tubular reactor.

Accordingly, it is possible in the process according to the invention to reproduce any required relative solution viscosity providing the residence time and the temperature prevailing in the reaction zone are carefully coordinated with one another.

After leaving the tubular reactor and cooling, the smooth bubble-free, fibre-reinforced polyamide strand is run off by means of an infinitely variable drive and delivered to a chopping machine. There is no lower limit to the cut length because the polyamide and the fibres form a firm bond. The granulate obtained can readily be melted and processed in extruders and injection-moulding machines.

Fibres suitable for the purpose of the invention include any fibres which consist of endless filaments or which can be spun into a strand or otherwise joined together; woven fabrics; webs; and mats; for example cotton, sisal, asbestos, synthetic organic or inorganic fibres, e.g., metal fibres, carbon-boron fibres and whiskers, and in particular glass fibres. Normally, fibres and especially glass fibres are coated with sizing agents and bonding agents in order both to protect them against destruction and to improve the polyamide-glass bond. They do not in any way affect polymerisation, in fact it is even possible to add adhesion promoters to the reaction mixture if they have not been applied to the fibres.

In addition to the bonding agents, the melts may contain other conventional components, such as fillers, dyes and pigments, lubricants, plasticisers, antistatic agents, stabilisers and surfactants. If required, the immersion tank should be provided with a stirring mechanism.

In view of the simplicity of the process according to the invention as a whole, it is clear that as many fibre strands as required may be simultaneously impregnated with the mixture and polymerised, and that the process is suitable for the continuous commercial production of fibre-reinforced polyamides.

The relative solution viscosities quoted in the following examples were measured on solutions of 1 g of polyamide in 100 ml of m-cresol at 20°C in an Ubbelohde viscosimeter.

The following examples are to further illustrate the invention without limiting it.

EXAMPLE 1

A glass fibre strand (with 12,240 elementary filaments each 9 $\mu$ in diameter) is impregnated in an immersion vessel (cf. FIG. I) with a polymerisable melt. The melt has a temperature of 110°C and comprises 100 parts by weight of caprolactam, 4.2 parts by weight of hexamethylene diisocyanate and 0.75 part by weight of sodium formate. The impregnated strand is passed through a stripper which removes enough melt to leave a material with a glass fibre content of 70 percent by weight. The strand then passes into a 3.5 metre long tubular reactor whose temperature varies from 200°C at the lower end to 280°C at the upper end. The residence time in the tubular reactor is 4.1 minutes.

After leaving the tubular reactor, a pale brown coloured polyamide strand with a relative solution viscosity in m-cresol of 2.97 is obtained. The strand is granulated and the granulate thus obtained is injection-moulded into test specimens. The following results are obtained:

| | |
|---|---|
| Impact strength: | 48.2 cmkp/cm$^2$ |
| Notched impact strength: | 19.2 cmkp/cm$^2$ |
| Flexural strength: | 3276 kp/cm$^2$ |

EXAMPLE 2

A glass fibre strand is impregnated as in Example 1. The only difference is that the stripper is arranged in such a way as to leave the material with a glass fibre content of 75 percent by weight. The tubular reactor with a temperature ranging from 200° to 280°C as in Example 1 is flushed with nitrogen as protective gas in order to prevent discolouration of the polymer. The residence time of the material in the tubular reactor is varied in order to control viscosity. The residence times amount to 5.6 minutes; 4.1 minutes; 3.2 minutes; 2.6 minutes and 2.05 minutes. Colourless glass-fibre-reinforced polyamide strands of the following relative solution viscosities in m-cresol are obtained:

| Residence time in the tubular reactor (minutes) | Relative solution viscosity in m-cresol |
|---|---|
| 5.6 | 3.67 |
| 4.1 | 3.02 |
| 3.2 | 2.33 |
| 2.6 | 1.92 |
| 2.05 | 1.78 |

From the sample whose residence time in the reactor was 4.1 minutes and whose relative viscosity of the solution in m-cresol 3.02, test specimens were made up in an injectionmoulding machine after the strand had been granulated. The following results were obtained:

| | |
|---|---|
| Impact strength: | 62.7 cmkp/cm$^2$ |
| Notched impact strength: | 27.6 cmkp/cm$^2$ |
| Flexural strength: | 3580 kp/cm$^2$ |
| Ball indentation hardness: | 3180 kp/cm$^2$ |

EXAMPLE 3

A glass fibre strand is impregnated as in Example 1. In this instance, the melt contains 10 parts by weight of lauric lactam in addition to 100 parts by weight of caprolactam, 4.2 parts by weight of hexamethylene diisocyanate and 0.75 parts by weight of sodium formate. The strand is passed through a stripper in such a way as to leave the material with a glass fibre content of 70 percent by weight. The residence time in the tubular reactor (containing nitrogen as the inert gas) is 4.6 minutes, whilst the temperature is in the range from 200 to 290°C. A polyamide with a relative solution viscosity in m-cresol of 2.91 is obtained.

EXAMPLE 4

A glass fibre strand is impregnated as in Example 1 in a mixed melt containing 100 parts by weight of caprolactam, 6.0 parts by weight of diphenyl methane-4,4'-diisocyanate and 0.75 part by weight of sodium formate. The impregnated strand is passed through a stripper in such a way as to leave the material with a glass fibre content of 60 percent by weight. The temperatures prevailing in the tubular reactor (filled with nitrogen as the inert gas) are from 200° to 280°C, and the residence times are 5.2 minutes; 3.5 minutes; 2.6 minutes; 2.1 minutes and 1.75 minutes. The resulting relative solution viscosities of the polyamide in m-cresol are as follows:

| Residence time in the tubular reactor (minutes) | Relative solution viscosity in m-cresol |
|---|---|
| 3.5 | 3.72 |
| 2.6 | 3.46 |
| 2.1 | 2.85 |
| 1.75 | 2.61 |
| 1.4 | 2.44 |

EXAMPLE 5

The procedure is as described in Example 1, except that a glass fibre web or mat is impregnated instead of a glass fibre strand. A material with a glass fibre content of 50 percent by weight is formed. The polyamide has a relative viscosity in m-cresol of 3.2.

EXAMPLE 6

The procedure is as in Example 1, except that an iron fibre web or mat is used instead of a glass fibre strand. The polyamide has an iron content of 20 percent by weight and a relative viscosity in m-cresol of 3.5.

What we claim is:

1. A process for the continuous production of homogeneous fibre-reinforced polyamide molding compositions which comprises drawing a fibre structure through a melt of a normally foamable polymerisation mixture, which contains but is substantially unaffected by up to 0.3 percent by weight of water, and which comprises a commercial grade lactam containing at least four ring members, from 0.05 to 10 percent by weight, based on the lactam, of a catalyst selected from the group consisting of an alkali metal and an alkaline earth metal salt of formic acid and from 0.05 to 20 percent by weight, based on the lactam used, of an activator selected from the group consisting of an organic isocyanate and a masked organic isocyanate and impregnating said fibre structure with said polymerization mixture, thereafter guiding the impregnated structure through a reaction zone which has a temperature in the range from the temperature of the polymerization mixture to 350°C, and polymerizing the impregnated fibre structure in the reaction zone, cooling the polymerized structure thus obtained and thereafter chopping it into a granulate free of foam bubbles.

2. The process of claim 1 wherein the polymerization mixture contains traces of atmospheric oxygen which do not substantially affect said mixture.

3. The process of claim 1, wherein said lactam is caprolactam.

4. The process of claim 1, wherein said catalyst is sodium formate.

5. The process of claim 1, wherein said activator is selected from the group consisting of an organic polyisocyanate and a masked organic polyisocyanate.

6. The process of claim 1, wherein said activator is hexamethylene diisocyanate.

7. The process of claim 1, wherein said activator is diphenyl methane diisocyanate.

8. The process of claim 1, wherein said polymerisation mixture used gives off an inert gas used as a protective gas at the reaction temperature.

9. The process of claim 1, wherein said fibre structure is a fibre strand.

10. The process of claim 9, wherein said fibre strand is a glass fibre strand.

11. The process of claim 1, wherein said fibre structure is a fibrous web.

12. The process of claim 1, wherein said fibre structure consists of metal fibres.

* * * * *